United States Patent [19]

Sherman

[11] Patent Number: 4,627,631
[45] Date of Patent: Dec. 9, 1986

[54] SPRAY-SUPPRESSING MUD FLAP ASSEMBLY

[75] Inventor: Robert C. Sherman, Clinton, Conn.

[73] Assignee: Carl J. Messina, Clinton, Conn.

[21] Appl. No.: 616,131

[22] Filed: Jun. 1, 1984

[51] Int. Cl.⁴ .............................................. B62D 25/16
[52] U.S. Cl. ............................................. 280/154.5 R
[58] Field of Search ................... 280/154.5 R, 153 R, 280/152 R

[56] References Cited

U.S. PATENT DOCUMENTS

| 205,137 | 6/1966 | Weasel, Jr. .............................. D14/6 |
| 260,759 | 9/1981 | Arenhold ............................. D12/16 |
| 2,714,015 | 7/1955 | Sherman .......................... 280/154.5 |
| 2,831,702 | 4/1958 | Eaves et al. ...................... 280/154.5 |
| 3,027,178 | 3/1962 | Eaves ............................ 280/154.5 R |
| 3,743,343 | 7/1973 | Grote, Sr. ............................ 296/1 S |
| 3,776,571 | 12/1973 | Gilles et al. .................. 280/154.5 R |
| 3,782,757 | 1/1974 | Juergens ....................... 280/154.5 R |
| 3,869,617 | 3/1975 | Gaussoin et al. ..................... 290/1 S |
| 3,929,352 | 12/1975 | Arenhold ..................... 280/154.5 R |
| 4,315,634 | 2/1982 | Arenhold ..................... 280/154.5 R |

FOREIGN PATENT DOCUMENTS 1226899 10/1966 Fed. Rep. of Germany ... 280/154.5 R

Primary Examiner—David M. Mitchell

[57] ABSTRACT

A spray suppressing mud flap includes an inwardly and rearwardly flared portion. The flared portion directs spray from the wheels inwardly. The mud flap is mounted by a bracket to extend laterally from the truck frame.

22 Claims, 7 Drawing Figures

SPRAY-SUPPRESSING MUD FLAP ASSEMBLY

BACKGROUND AND SUMMARY OF THE INVENTION

This invention relates to a mud flap assembly for tractor-trailer and straight-body trucks, and more particularly to a self-supporting, spray-suppressing mud flap for such trucks.

The utilization of mud flaps on dual wheel vehicles such as tractors, trailers, etc., has long been required to protect near-by vehicles from debris thrown up by the truck tires. During wet and rainy road conditions however, the prior mud flaps tend to produce a lateral outboard spray of water. Such a lateral spray from these large trucks detrimentally effects the visibility of near-by vehicles thereby increasing the potential danger of wet road conditions.

The occurrence of lateral spray from these large, dual-wheel trucks is a recognized safety hazard and consequently, recent federal legislation in the form of the Surface Transportation Assistance Act of 1982 imposes the requirement that these trucks be equipped with splash and spray-suppressing devices.

In attempting to suppress lateral water spray, some of the prior mud flaps employ a dispersing or textured flap surface facing the tires. One such textured surface mud flap is sold under the trade mark "Spray Guard" by Monsanto Company of St. Louis, Mo. and utilizes a surface similar to artificial turf for spray suppression. Other textured surface mud flaps utilize a dispersing pattern molded into the mud-flap surface.

The textured surface mud flaps exhibit several significant shortcomings such as susceptibility to snow and ice accumulation and increased loading on the mud-flap mounting bracket assembly so as to damage existing bracket assemblies or require the use of specialized, heavy-duty bracket assemblies. Inherently, the textured surface provides projections which facilitate the initial adherence of snow or ice to the mud flap which in turn provides an irregular surface for the adherence of more snow and ice. The weight of accumulated ice and snow can cause excessive loading on the mud flap and on the bracket assembly causing damage to the mud flap and/or bracket assembly. The additional weight of accumulated ice and snow also reduces the operating efficiency of the truck. The use of surfaces similar to artificial turf for spray suppression also increases the gross weight of the mud flap so as to require specialized, heavy-duty bracket assemblies.

Other spray-suppressing devices such as shown in U.S. Pat. No. 3,869,617 to Gaussoin et al. require costly and involved frames and mounting brackets which appear fragile and impractical for the demands of tractor-trailer truck operation and maintenance. U.S. Pat. No. 3,743,343 to Grote, Sr., et al. shows a similarly involved spray-suppression device.

Additionally, the mounting assemblies for both spray-suppressing and nonspray-suppressing mud flaps have significant shortcomings. Generally, the mud flap is connected along its upper edge to a horizontal support rod or to the underbody of the truck so as to hang freely therefrom. By such mounting, the mud flap exhibits undesirable "sailing" during truck operation. Moreover, in tractor-trailer truck applications, the mounting assemblies and mud flaps are susceptible to damage during vehicle operation as set forth in U.S. Pat. No. 4,335,862 to Sherman wherein a specialized heavy-duty, pivotal mounting bracket is disclosed to alleviate the occurrence of such damage to the mud-flap and the mounting assembly. Certainly, the replacement and repair of mounting bracket assemblies and mud flaps result in undesirable labor and maintenance expense.

Accordingly, it is an object of the present invention to provide a mud-flap assembly for truck vehicles that effectively suppresses lateral spray to foster vehicle safety and that obviates the foregoing and related disadvantages.

Another object of the invention is to provide a spray-suppressing mud flap that is laterally mounted to the frame rail of a truck for easy and economical installation and replacement.

A further object of the invention is to provide a spray-suppressing mud flap that prevents detrimental snow and ice accumulation thereon.

Another object of the invention is to provide a spray-suppressing mud-flap and mounting assembly that is economical to manufacture, durable and long lasting in use, and of universal size to fit a wide range of truck vehicles and wheel positions.

Other objects will be in part obvious and in part pointed out in more detail hereinafter.

Accordingly, it has been found that the foregoing objects and advantages can be readily attained in a spray-suppressing mud-flap assembly having a sheet element with opposed forward and rearward surfaces and being adapted for mounting aft of the truck tires so that its forward surface faces forwardly toward the tires. The sheet element has opposed inboard and outboard sides, a planar upper mounting portion, a flared middle portion, and a lower portion. The flared middle portion forms a flared concave air guiding surface in the forward surface of the sheet element that opens inwardly and rearwardly to direct air inboard of the truck. A first blade member for stopping water and spray from passing upwardly over the top of the sheet element extends across the planar upper portion between the inboard and outboard sides and protrudes forwardly from the forward surface of the sheet element. A second blade member for stopping water and spray from passing outwardly from the outboard side of the sheet member extends along the outboard side of the sheet element and protrudes forwardly from the forward surface of the sheet element. The forward surface of the sheet element is smooth so as to prevent the adherence of snow and ice. The sheet element with the first and second blades is of unitary molded construction.

A mounting bracket for mounting the mud-flap sheet element to the frame rail of a truck includes a first leg section rigidly connected to the planar upper mounting portion of the sheet element so as to extend laterally from the inboard vertical side thereof. A second leg section is adapted for rigid connection to the frame rail of a truck so that the mud flap sheet element is positioned aft of the vehicle tires.

DESCRIPTION OF THE PREFERRED EMBODIMENT

Figure 1:
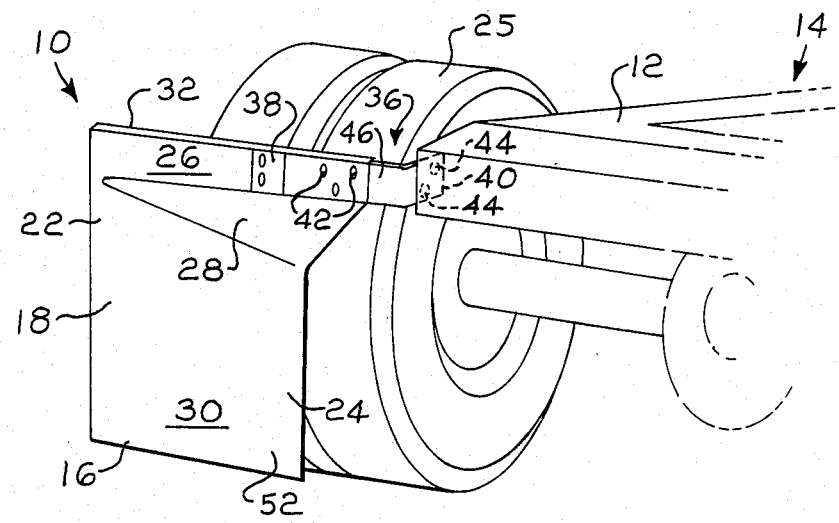
FIG. 1 is a rear diagrammatical perspective view of the mud-flap assembly of the present invention mounted to the driver's-side frame rail of a truck vehicle.

The spray-suppressing mud flap of the present invention is generally designated by the numeral 10 and is shown in FIG. 1 laterally mounted to the frame rail 12 of a conventional tractor-trailer truck 14.

Figure 2:
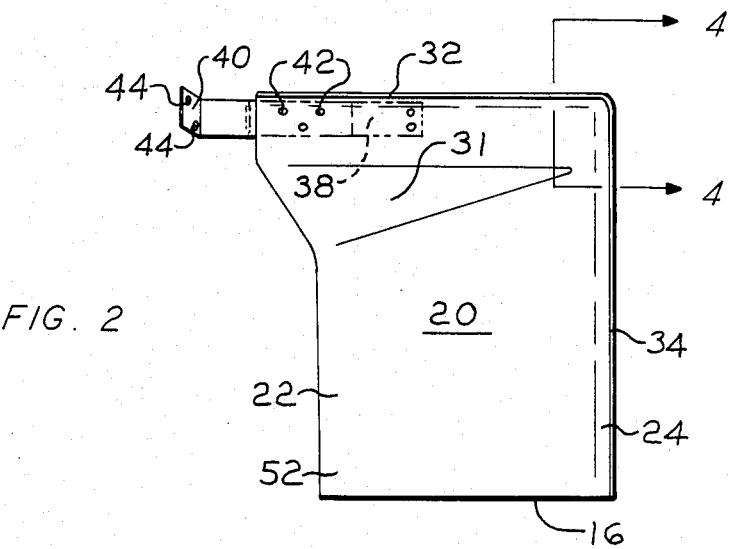
FIG. 2 is a diagrammatical front view of the mud flap of FIG. 1 showing the forward tire-facing surface.
Figure 3:
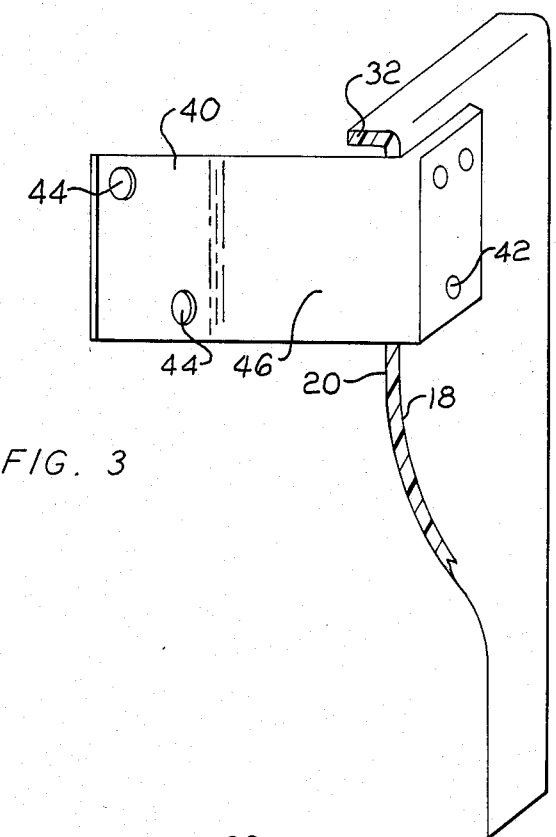
FIG. 3 is an enlarged, partially broken-away sectional view seen on line 3—3 of FIG. 2.

Referring to FIGS. 1 and 2, the mud flap 10 is generally comprised of a molded sheet element 16 having opposed rearward and forward surfaces 18, 20 bounded by outboard vertical side 22 and inboard vertical side 24. The forward surface 20 faces the vehicle tires 25 and is a smooth surface without protrusions to prevent snow and ice accumulation. For purposes of description, the rearward and forward surfaces 18, 20 of the sheet element 16 are horizontally divided into a planar upper mounting portion 26, a flaired middle portion 28, and a lower flap portion 30.

The flared middle portion 28 forms a flared concaved air guiding surface or scoop 31 in the forward surface 20 of the sheet element 16 as shown in FIG. 2. The flared air-guiding surface 31 opens inboard and downwardly from the outboard vertical side 22 to direct air downwardly and inboard of the truck 14. The lower corner portion 52 of the sheet element 16 is also flared inwardly and rearwardly.

A horizontal blade member 32 extends along the upper portion 26 of the sheet element 16 between the vertical sides 22, 24 and protrudes forwardly from the forward surface 20. Preferably, the member 32 is positioned at the upper edge of the upper portion 26 and is generally orthogonal to the forward surface 20. The blade member 32 is dimensioned and configured for stopping water and spray from passing upwardly over the top of the sheet element and to provide stiffness to the sheet member 16 to facilitate lateral or side mounting of the mud flap to the frame rail 12. As will be explained subsequently, the blade member 32 also contributes to directing the flow of air downwardly and inwardly to attain the aerodynamic spray-suppressing characteristics. Various other blade configurations and positions may be acceptable to attain adequate blocking of water and spray. Also, other acceptable means for stiffening the upper portion 26 may be utilized such as a plate interposed between the mounting bracket and the planar mounting portion 26.

Figure 4:
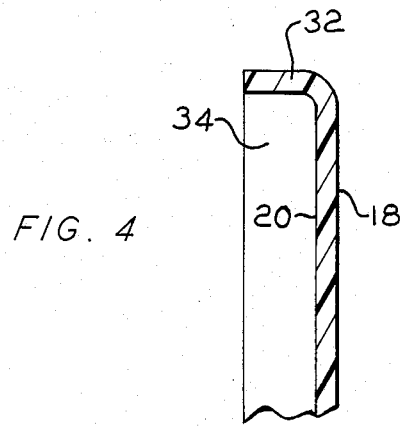
FIG. 4 is an enlarged, partially broken-away sectional view seen on line 4—4 of FIG. 2.
Figure 5:
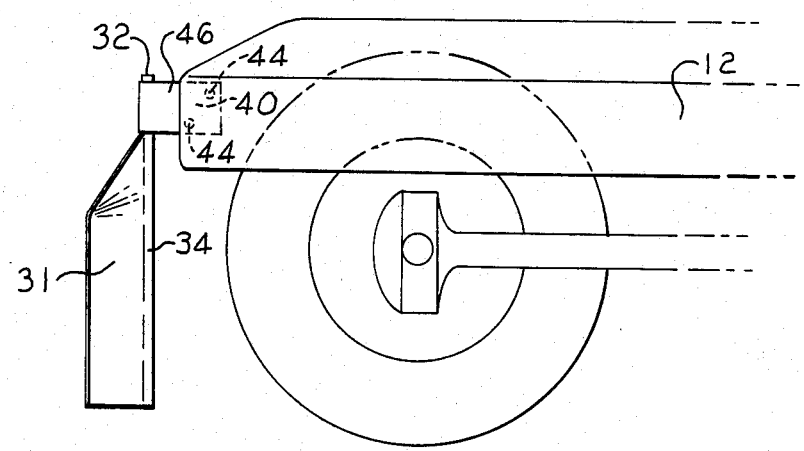
FIG. 5 is a side view similar to FIG. 1.
Figure 6:
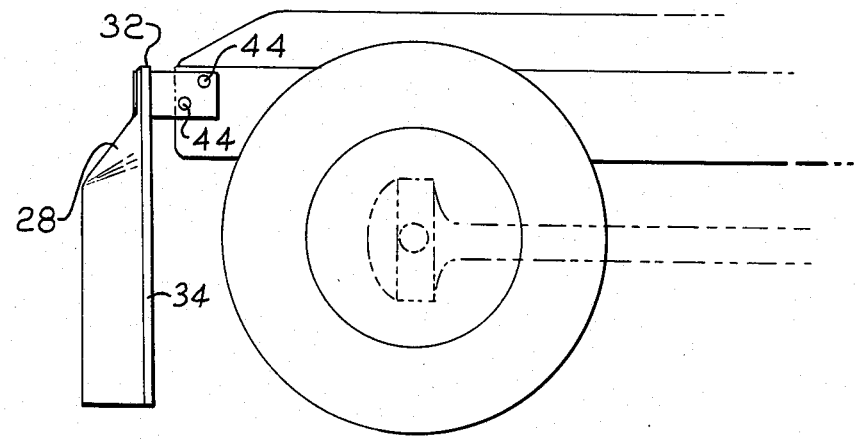
FIG. 6 is a side view similar to FIG. 5 of the opposite side of the mud-flap assembly.

Referring to FIGS. 2 and 4, a second blade member 34 extends along the outboard vertical side 24 and protrudes forwardly from the forward surface 20 of the sheet element 16. The blade member 34 is preferably orthogonal to the forward surface 20. The blade member 34 is dimensioned and configured for stopping water and spray from passing outwardly from the outboard side 24 and to provide stiffness along the outboard vertical side to prevent undesirable "sailing" of the mud flap. The blade members 32 and 34 combine to trap ram air flowing along and around the tires 25 to help create the inboard air flow in achieving the aerodynamic spray-suppressing effect. Various other blade confi9urations and positions may be acceptable to attain adequate deflection of water and spray inwardly from the outboard side 24 of the sheet element. Also, other acceptable means for vertically stiffening the outboard side of the sheet element may be utilized.

While the blade members 32, 34 provide stiffening or stability to the outboard side 24 and to the upper portion 26 of the mud flap, the inboard side of the lower portion 30 is not so stiffened but rather is configured to be somewhat flexible relative to both the outboard side 24 and to the upper portion 26 so as to permit the inboard lower corner portion 52 of the mud flap 10 to move slightly in a rearward direction during forward movement of the truck to facilitate the inward and downward dispersal of water and spray. Moreover, the semiflexible characteristic of the inboard portion of the mud flap allows it to move easily so as not to break if hit by the landing gear or dolly legs of the trailer. The more rigid outboard and upper portions of the mud flap also are configured to move or flex in response to impact to prevent damage to the mud flap.

In the illustrated embodiment, the mud flap 10 including the sheet element 16 and the blade members 32, 34 is a unitary molded construction preferably comprised of plastic material. Other acceptable materials such as plastic-rubber or rubber may be utilized and, accordingly, the amount of stiffening required from blade members 32, 34 will depend upon the material and dimensions of the sheet element 16.

Referring to FIGS. 1 and 2 the mud flap 10 is mounted to the frame rail 12 by a mounting bracket generally designated by the numeral 36. Importantly, the configuration of the mud flap 10 allows lateral mounting to the frame rail 12 for easy and economical installation and replacement. The mounting bracket 36 is comprised of a first leg section 38 rigidly connected to the planar upper mounting portion 26, a middle section 46 and a second leg section 40 rigidly connected to the frame rail 12. The first leg section 38 is configured in the form of a plate element and is rigidly connected by two or three threaded fasteners 42 to the upper mounting portion 26 so that the mounting bracket 36 extends laterally from the sheet element 16 as shown in FIG. 1.

The second leg section 40 is also configured in the form of a plate member and is rigidly connected to the frame rail 12 by threaded fasteners 44 to position the mud flap 12 directly behind the vehicle tires 25 of the truck 14. The mud flap 10 is positioned so that the forward surface 20 faces the tires 25 with the outboard side 24 and the upper edge being in proper alignment with the upper and outer boundaries of the tires 25 so as to trap the ram air passing around the tires and direct the spray inwardly. In alternative truck configurations, the middle section 46 may be disposed at a predetermined angle relative to the first and second leg sections for positioning the mud flap directly behind the vehicle wheels.

Figure 7:
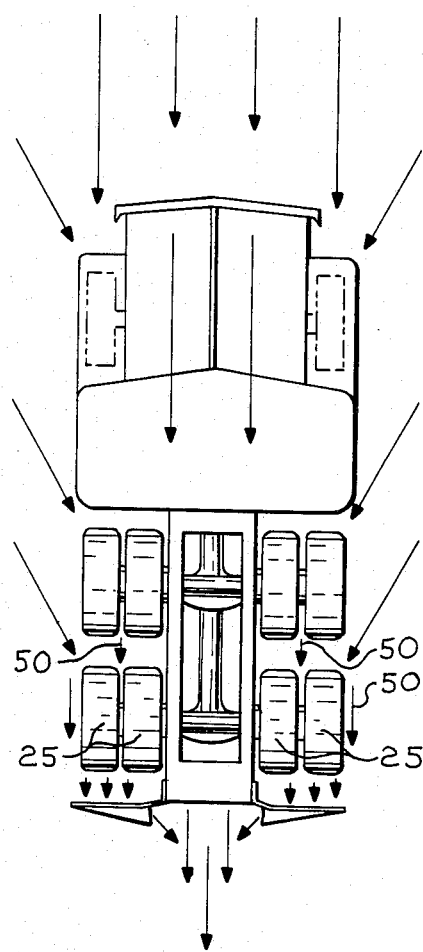
FIG. 7 is an air flow diagram of the mud flap of the present invention mounted to a truck vehicle.

In operation, the mud flap 10 suppresses lateral spray from the vehicle tires 25 and directs it inboard of the truck 14 as diagrammatically illustrated in FIG. 7. As the truck moves forward, the air passing along and around the tires 25, as indicated by the flow arrows 50, impinges on the forward surface 20 of the mud flap. This air flow is directed inwardly or inboard of the truck 14 by the flared middle portion 28 of the mud flap 10 to aerodynamically suppress lateral spray. The blade members 32 and 34 also tend to trap and direct the ram air flow into the concave flared portion of the middle section 28. As previously explained, the blade members 32 and 34 provide stiffening or stability to the outboard vertical side 24 and the upper portion 26 of the mud flap to prevent undesirable "sailing". However, the inboard lower corner portion 52 of the mud flap 10 is allowed to move slightly rearwardly during operation to further disperse the spray inwardly and downwardly relative to the truck 14.

The blade member 32 blocks the upward flow of water on the forward surface of the sheet element to prevent the water from passing over the top of the sheet element and the inwardly directed air flow carries the water inboard of the truck. Similarly the blade member 34 stops water from passing outwardly from the outboard side of the sheet member. The blade member 34 also deflects water and spray inwardly from the outboard side of the mud flap while the blade member 32 deflects water and spray downwardly from the upper portion of the mud flap. The downward deflecting action of the blade member 32 prevents water and spray from impinging the underbody of the truck 14 and deflecting laterally outboard therefrom.

During operation under wintertime conditions, the smooth forward surface 20 of the mud flap 10 prevents the accumulation of snow and ice thereon and consequently obviates the attendant problems resulting from such accumulation. That is, the smooth forward surface 20 does not provide any detrimental texture or irregularities for snow and ice adherence. As can be appreciated, apparently minor irregularities may cause significant accumulations since snow tends to accumulate readily upon snow so that the smallest initial accumulation may ultimately become problematic.

In mounting the mud flap 10 to the frame rail 12 as shown in FIG. 1, the mounting bracket 36 provides a quick and easy rigid connection to the frame rail 12 by threaded fasteners 44. The ease and quickness of mounting and dismounting contributes to the economical advantages of the present invention in the assembly of new vehicles, in the retrofitting of existing vehicles and in subsequent repair and replacement.

The frame rail mounting afforded by the mounting bracket 36 allows the mud flap 10 to be positioned in close proximity directly behind the vehicle tires 25 for effective spray and mud suppression. In this regard, the mud flap may be mounted 6-8 inches aft of the vehicle tires. Since the vertical position of the frame rails is relatively standard throughout the trucking industry, the mud flap 10 can be of fewer sizes (e.g., two) to provide universal size mud flaps that can be used with a wide variety of truck vehicles. Previously, various sizes were needed to accommodate the different mounting points on the vehicle bodies and the various mounting brackets. Thus, the lateral frame rail mounting of the mud flap 10 reduces manufacturing costs by necessitating only left and right mud flaps of one universal size and also reduces maintenance costs by eliminating the stocking of numerous mud flap sizes.

In the case of trailer and rigid-body trucks, frame rail mounting permits a relatively shorter mud flap to be utilized since heretofore the mud flaps were mounted directly to the undercarriage of the vehicle body. Accordingly, the relative (undesirable) "drag" from the mud flap is reduced since the area of the mud flap is less.

In the illustrated embodiment, the mud flap 10 is a unitary structure comprised of plastic material preferably vacuum molded or injection molded. The mounting bracket 36 is composed of plate metal configured to attain the desired orientation of the mud flap 10 to the vehicle tires 25. Both the mud flap 10 and the mounting bracket 36 are durable and designed for extended use. Should the mud flap 10 strike an object or, more specifically, contact the landing gear of a trailer, the flexibility of the mud flap 10 causes it to bend or give without breaking. Moreover, the mounting bracket 36 extends only partially across the width of the mud flap 10 (as compared to prior full-length support rods) and thus does not contact the trailer landing gear so as to damage the mounting bracket. Importantly, the combined weight of the mud flap and mounting bracket is significantly less than prior devices so as to increase operational efficiency.

Accordingly, the mud-flap assembly of the present invention effectively suppresses lateral spray to promote vehicle safety without undesirable snow and ice accumulation. Moreover, the mud-flap assembly is economical to manufacture and install, durable and long lasting in use and labor efficient to repair and replace.

As will be apparent to persons skilled in the art, various modifications and adaptations of the structure above described will become readily apparent without departure from the spirit and scope of the invention, the scope of which is defined in the appended claims.

I claim:

1. A spray-suppressing mud flap for mounting to the farme rail of truck vehicle, comprising:
    a sheet element having opposed forward and rearward surfaces and being adapted for mounting aft of the vehicle tires of a truck so that said forward surface faces forwardly toward the vehicle tires,
    said sheet element having upper and lower portions and opposed inboard and outboard sides,
    said upper portion of said sheet element having an upper planar mounting portion and a flared portion,
    said flared portion extending downwardly and inwardly so as to open downwardly, inwardly and rearwardly to form an air guiding surface in said forward surface of said sheet element to direct air downwardly and inboard of the truck,
    said lower portion of said sheet element being substantially rearwardly of said upper planar mounting portion and extending substantially vertically from said flared portion for dispersal of spray downwardly, rearwardly and inwardly when mounted to a truck,
    first blade means for stopping water and spray from passing upwardly over the top of said sheet element, said first blade means extending across said planar upper portion between said inboard and outboard sides and protruding forwardly from said forward surface of said sheet element, and
    second blade means for stopping water and spray from passing outwardly from said outboard side of said sheet member, said second blade means extending along said outboard side of said sheet element and protruding forwardly from said forward surface of said sheet element.

2. The device of claim 1 wherein said forward surface of said sheet element is substantially smooth so as to prevent the adherence of snow and ice to said forward surface when mounted to the frame rail of a truck.

3. The device of claim 1 wherein said lower portion of said sheet element comprises at least the lowermost half of said sheet member.

4. The device of claim 1 comprising means for stiffening said upper portion of said sheet element to facilitate lateral side mounting of said sheet member to a frame rail, said stiffening means being adjoining to said upper portion.

5. The device of claim 4 wherein said stiffening means comprises a plate element attached to said upper portion.

6. The device of claim 1 wherein said first blade means comprises a first blade member dimensioned and configured to stiffen said upper portion between said inboard and outboard sides to facilitate lateral mounting of said sheet member to a frame rail.

7. The device of claim 1 wherein said first blade means comprises a first blade member generally orthogonal to said forward surface.

8. The device of claim 1 wherein said upper portion has a laterally extending top edge and said first blade means comprises a first blade member positioned along said top edge.

9. The device of claim 1 wherein said second blade means comprises a second blade member generally orthogonal to said forward surface.

10. The device of claim 1 wherein said outboard side has a vertically extending side edge and said second blade means comprises a second blade member positioned along said side edge.

11. The device of claim 1 wherein said second blade means comprises a second blade member dimensioned and configured to stiffen said outboard side of said sheet element.

12. The device of claim 1 wherein said first blade means comprises a first blade element dimensioned and configured to stiffen said upper portion between said inboard and outboard sides, said second blade means comprises a second blade element dimensioned and configured to stiffen said sheet element along said outboard side so that said inboard side of said lower portion of said sheet element is semiflexible relative to both said upper portion and said outboard side to permit said inboard side of said lower portion to move rearwardly as a result of air flow from forward operation of a truck to which the mud flap is mounted.

13. The device of claim 1 wherein said lower portion of said sheet element is flared inwardly and rearwardly.

14. The device of claim 1 wherein said sheet element and said first and second blade means comprise a unitary structure.

15. The device of claim 14 being of molded construction.

16. The device of claim 1 further comprising means for laterally mounting said sheet element to a frame rail.

17. A spray-suppressing mud flap assembly for mounting to the frame rail of a truck vehicle, comprising:
a mud flap sheet element having,
upper and lower portions
opposed inboard and outboard vertical sides,
opposed forward and rearward surfaces,
said upper portion having a planar upper mounting portion adjacent said inboard vertical side and a flared portion,
said flared portion extending downwardly and inwardly so as to open downwardly, inwardly and rearwardly to form an air guiding surface in said forward surface of said sheet element to direct air downwardly and inboard of the truck,
said lower portion of said sheet element being substantially rearwardly of said upper planar mounting portion and extending substantially vertically from said flared portion for dispersal of spray downwardly, rearwardly and inwardly when mounted to a truck,
first blade means for stopping water and spray from passing over the top of said sheet element, and
second blade means for stopping water and spray from passing outwardly from said outboard vertical side, and
a amounting bracket for mounting said mud flap sheet element to the frame rail of a truck vehicle, said bracket having,
a first leg section rigidly connected to said planar upper mounting portion of said sheet element so as to extend laterally from said inboard vertical side, and
a second leg section adapted for rigid connection to the frame rail of a truck so that said mud flap sheet element is positioned aft of the vehicle tires with the forward surface facing the vehicle tires,
said mounting bracket adapted to laterally support said mud flap sheet element.

18. The assembly of claim 17 wherein
said first leg section is a first plate mounted in adjoining disposition to the planar mounting portion of said mud flap sheet element, and
said second leg section is a second plate adapted to be mounted in adjoining disposition to the frame rail of a truck vehicle.

19. The assembly of claim 18 wherein threaded fasteners rigidly connected said first plate to said planar mounting position.

20. The assembly of claim 18 wherein said second plate has fastener apertures adapted to receive thread fasteners for rigid connection to the frame rail.

21. The assembly of claim 18 wherein a middle plate interconnects said first and second plates in angled relationship to said first and second plates to position said mud flap sheet element in vertical orientation behind the vehicle wheels.

22. A spray-suppressing mud flap for lateral mounting to the frame rail of a truck vehicle, comprising:
a sheet element having opposed forward and rearward surfaces and being adapted for mounting aft of the vehicle tires of a truck so that said forward surface faces forwardly toward the vehicle tires,
said sheet element having upper and lower portions and opposed inboard and outboard sides,
said upper portion of said sheet element having an upper planar mounting portion and a flared portion,
said upper mounting portion being of predetermined stiffness sufficient to allow lateral mounting of said sheet element to a frame rail,
said flared portion extending downwardly and inwardly so as to open downwardly, inwardly and rearwardly to form an air guiding surface in said forward surface of said sheet element to direct air downwardly and inboard of the truck,
said lower portion of said sheet element being substantially rearwardly of said upper planar mounting portion and extending substantially vertically from said flared portion for dispersal of spray downwardly, rearwardly and inwardly when mounted to a truck, and
blade means for stopping water and spray from passing upwardly over the top of said sheet element, said blade means extending across said upper portion between said inboard and outboard sides and protruding forwardly from said forward surface of said sheet element.

* * * * *